June 29, 1943.   W. R. PERRY   2,322,967
BELT SPLICE
Filed July 13, 1942    3 Sheets-Sheet 1
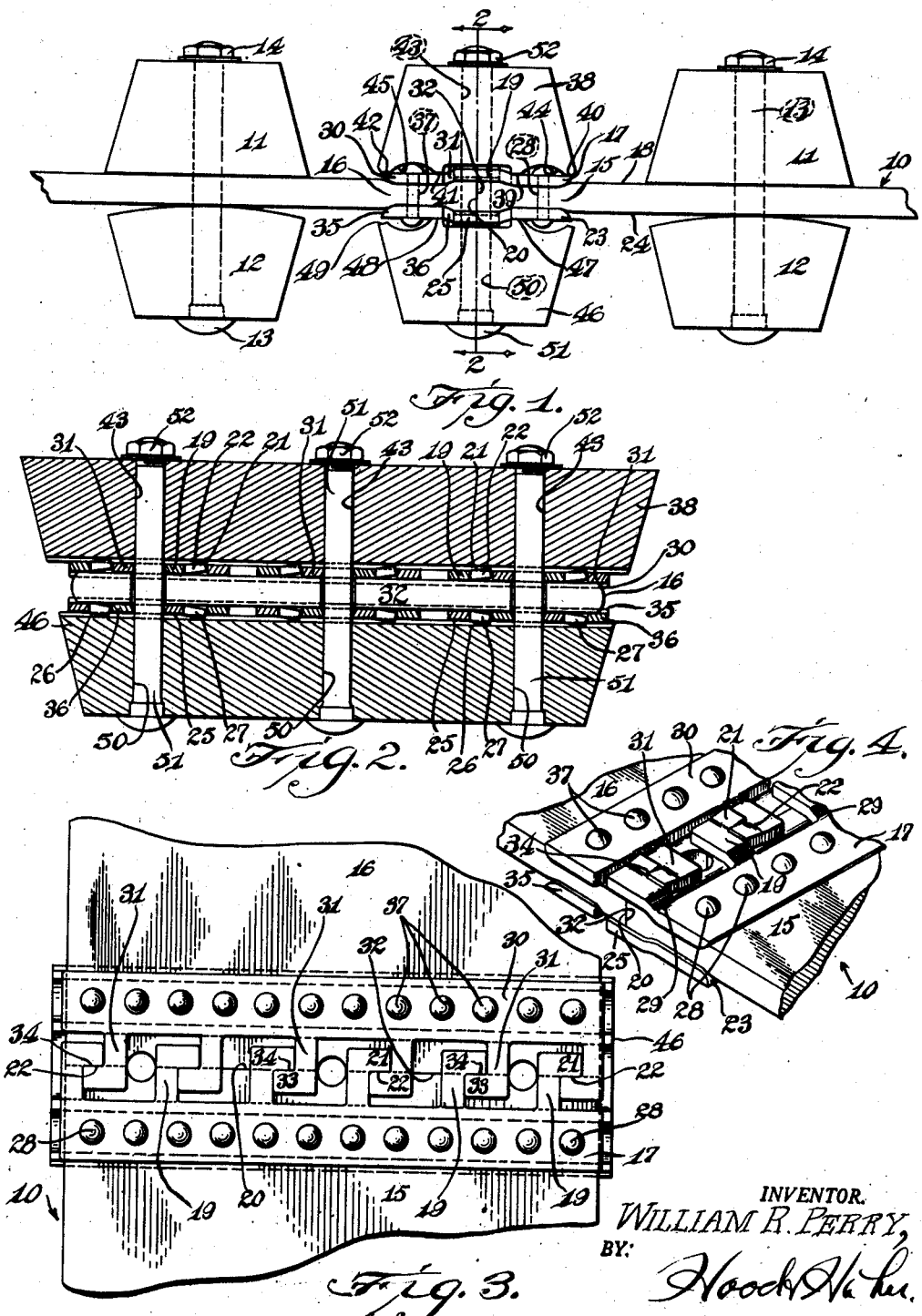
INVENTOR.
WILLIAM R. PERRY,
BY: Hood & Acher
ATTORNEYS.

June 29, 1943.  W. R. PERRY  2,322,967
BELT SPLICE
Filed July 13, 1942  3 Sheets-Sheet 2
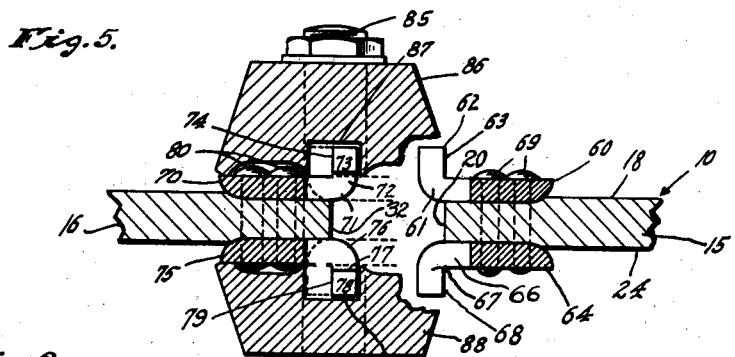
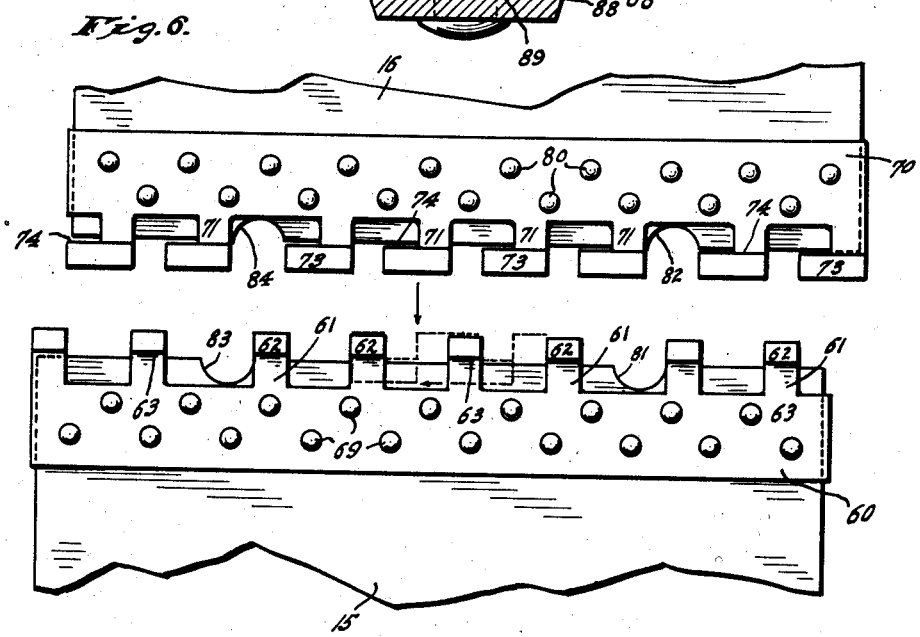
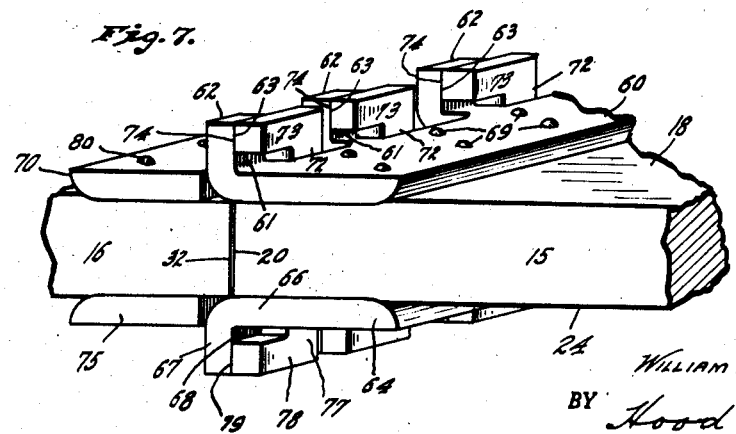
INVENTOR.
WILLIAM R. PERRY,
BY Hood & Hahn
ATTORNEYS.

Patented June 29, 1943

2,322,967

UNITED STATES PATENT OFFICE 2,322,967

BELT SPLICE

William R. Perry, Columbus, Ind., assignor to Reeves Pulley Company, Columbus, Ind., a corporation of Indiana Application July 13, 1942, Serial No. 450,812

8 Claims. (Cl. 24—31)

The present invention relates to a belt splice, and is particularly concerned with the problem of providing a splice for the ends of a belt band which band is relatively flexible, both longitudinally and transversely, but which is transversely stiffened by blocks clamped to the inner and outer surfaces of the belt band. The primary object of the invention is to provide a simple, but highly efficient, splice means whereby the two ends of the band may be readily connected together or disconnected, through which a pull-transmitting connection will be established, and the parts of which will be rigidly, yet simply, held against disengagement. A further object of the invention is to provide, in such a splice, for a considerable degree of flexibility about an axis extending transversely of the belt band. Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a side elevation of a fragment of a belt of the character here under consideration, the ends of which are connected together through one form of my novel splice;

Fig. 2 is a transverse section taken substantially on the line 2—2 of Fig. 1 and looking in the direction of the arrows;

Fig. 3 is a plan view of the splice of Fig. 1, the outer block and clamping bolts having been removed;

Fig. 4 is a fragmental perspective view of the same splice, in the absence of the securing blocks;

Fig. 5 is a longitudinal section through a modified form of splice;

Fig. 6 is a plan view of the splice of Fig. 5 before assembly of the band ends;

Fig. 7 is a fragmentary perspective view of the splice of Fig. 5, in the absence of the reinforcing blocks;

Figure 8:
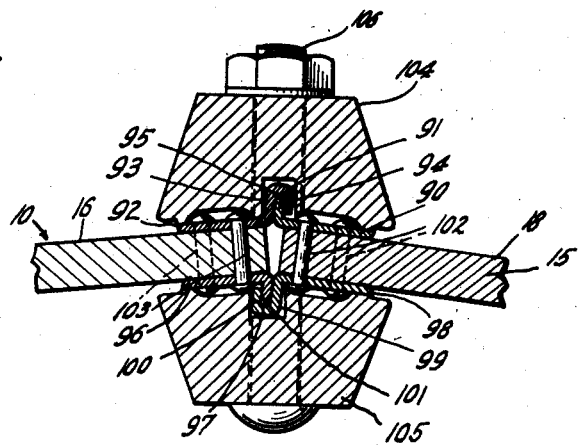
Fig. 8 is a longitudinal sectional view through a still further form of splice.

Referring more particularly to the form of the invention illustrated in Figs. 1-4, it will be seen that I have illustrated a belt band indicated generally by the reference numeral 10. In the illustrated embodiment of the invention, the band 10 is relatively wide, as will be seen from an inspection of Fig. 3, for instance, and transverse rigidity is lent to the belt by a series of blocks 11 associated with the outer surface of the band and a series of blocks 12 associated with the inner surface thereof, said blocks being clamped to the belt band in pairs by one or more bolts 13 each passing through a pair of blocks 11 and 12 and through the belt band, and receiving a nut 14 on its projecting end. Of course, the splices of the present invention are not limited in their application to such a belt, but they find a high degree of utility in connection with such a belt.

The splice illustrated in Figs. 1-4 is intended to secure together the end portions 15 and 16 of the belt band 10. A plate 17, having a transverse dimension substantially equal to the transverse dimension of the band 10, is associated with the outer surface 18 of the end portion 15 of said band. The plate 17 is formed to provide a plurality of transversely spaced fingers 19 projecting longitudinally beyond the extremity 20 of the band end 15. Each finger 19 is formed with a terminal portion 21 projecting laterally in a common direction, each such terminal portion thus providing a surface 22 lying parallel to the extremity 20. Thus the terminal portions 21 of the fingers 19 provide a series of transversely spaced surfaces lying in a common plane parallel with, and facing, the belt end extremity 20. In the preferred embodiment of the invention, the plane of the surfaces 22 coincides with the vertical plane including the extremity 20 of the belt band.

A similar plate 23 is associated with the inner surface 24 of the band end 15, said plate being formed with a similar series of fingers 25 projecting longitudinally beyond the extremity 20 of the belt band. Each of said fingers is formed with a laterally extending terminal portion 26, which portions immediately underlie the terminal portions 21 of the fingers 19, and provide surfaces 27 coplanar with the surfaces 22.

The plates 17 and 23 are secured to the belt end 15 by a series of rivets 28 passing through said plates and through said belt end and headed over against the remote surfaces of the plates. The rivets are applied under a predetermined pressure, so that the belt body is somewhat compressed between said plates. Those portions of the belt body which lie between the transversely spaced shanks of the fingers 19 and 25 will bulge outwardly somewhat, in the manner illustrated in the drawings; and therefore, the fingers 19 are formed with offset portions 29, while the fingers 25 are formed with similar offset portions, whereby the fingers 19 and 25 are caused to flare away from each other, in order that they may readily clear the bulging portions of the band end 16 between the fingers carried by said band end 16. Similarly, the terminal portions 21 and 26 are preferably bent outwardly somewhat, in the manner illustrated in the drawings, to simplify assembly of the splice.

A plate 30, similar to the plate 17, is associated with the outer surface of the band end 16. Said plate 30 is provided with a series of fingers 31 similar to the fingers 19, each formed with a laterally projecting terminal extension 33. Because of the fact that the plate 30 is so assembled with the belt end 16 that its fingers 31 project oppositely with respect to the fingers 19 of the plate 17, the terminal portions 33 thereof likewise project oppositely with respect to the terminal portions 21 of the fingers 19. The plate 30 is so assembled with the belt end 16 that its fingers 31 are staggered with respect to the fingers 19 of the plate 17; and the terminal portions 33 of said fingers provide surfaces 34 lying in a common plane spaced longitudinally from the adjacent edge of the plate and, in the preferred embodiment of the invention, lying in the vertical plane including the extremity 32 of the band end 16. A plate 35 like the plate 23 is associated with the inner surface of the band end 16, said plate being provided with fingers 36 like the fingers 31 and having transversely extending terminal portions (not shown) immediately underlying the terminal portions 33 of the fingers 31. The plates 30 and 35 are secured to the belt end 16 by rivets 37 like the rivets 28.

The fingers of each series are spaced apart a distance equal to the transverse dimension of a finger shank plus twice the lateral extent of a finger terminal portion, so that, looking at Fig. 3, the belt end 15 may be shifted to the left with respect to the belt end 16 far enough for the extremities of the fingers 21 to clear the extremities of the fingers 33, whereupon the belt ends may be separated by relative longitudinal movement thereof. When the belt ends are to be connected, they are brought together in longitudinal misalignment. The fingers 19 and 25 span the terminal portion of the band end 16, while the fingers 31 and 36 span the terminal portion of the band end 15, the laterally extending portions 21 of the fingers 19 are caused to move longitudinally past the laterally extending portions 33 of the fingers 31, while the corresponding portions 26 of the fingers 23 move longitudinally past the laterally extending portions of the fingers 36, until the surfaces 22 have passed the surfaces 34 and the surfaces 27 have passed the corresponding surfaces of the terminal portions of the fingers 36. Then, by relative transverse movement of the band ends, the laterally extending terminal portions of the fingers 19 are hooked behind the laterally extending terminal portions 33 of the fingers 31, while the portions 26 of the fingers 25 are similarly hooked behind the corresponding portions of the fingers 36 to establish a pull-transmitting connection between the belt ends 15 and 16.

It will be seen that, in the preferred embodiment of the invention, a common plane contains the surface 20 and the surface 32 of the band ends 15 and 16, the engaging surfaces 22 and 34, and the surfaces 27 and the corresponding surfaces of the terminal portions of the fingers 36. The shanks of the fingers 25 and 36 are long enough to permit some relative movement of the fingers 25 and 36 in a direction tending to separate the surfaces 27 from the corresponding surfaces of the terminal portions of the fingers 36. It follows that the splice is somewhat flexible about an axis lying in the above-mentioned plane, in that the plates 30 and 17 may be rocked slightly about an axis lying in the common plane of the engaging surfaces 22 and 34.

A block 38 similar to the blocks 11 is now laid in position straddling the above-mentioned plane and engaging the exposed surfaces of the plates 17 and 30. It will be noted that the block 38 contacts the plate 17 at a point 39 near said common plane and at a point 40 remote from said common plane; and engages the plate 30 at a point 41 near said common plane and at a point 42 remote from said common plane. The inner surface of the block 38 is preferably formed with transverse grooves 44 and 45 for the accommodation of the heads of the rivets 28 and 37.

A block 46 similar to the block 12 is now associated with the plates 23 and 35. It is to be particularly noted that the block 46 engages the plate 23 only at the point 47, closely adjacent the above-mentioned plane, and at the point 48 likewise closely adjacent said plane, the upper surface of said block being rounded off as at 49 in the manner of the upper surfaces of the blocks 12.

This construction substantially prevents flexing of the splice in a direction to move the remote edges of the plates 17 and 30 upwardly, as viewed in Fig. 1, but permits some flexing of said splice in a direction tending to move said remote edges downwardly as viewed in Fig. 1.

The blocks 38 and 46 are provided with bores 43 and 50, respectively, for the reception of bolts 51 which pass therethrough to receive nuts 52, clamping the blocks 38 and 46 together. Said bolts 51 perform a further function, in that the block bores are so spaced as to register with the spaces between certain of the fingers 19 and adjacent fingers 31. Referring to Fig. 3, it will be seen that bolts passed through the bores 50 will lie between fingers 19 and adjacent fingers 33 in such positions as to prevent movement of the plate 17 to the left relative to the plate 30. Thereby, the bolts 50 lock the splice elements against relative movement in a direction transverse to the belt length, while the blocks 38 and 46 hold the splice elements against relative movement in a direction perpendicular to the plane of the belt body.

Referring, now, to the form of the invention illustrated in Figs. 5–7, it will be seen that I have shown a plate 60, having a transverse dimension substantially equal to the transverse dimension of the band 10, associated with the outer surface 18 of the end portion 15 of the band 10. The plate 60 is formed to provide a plurality of transversely spaced fingers 61 each projecting longitudinally beyond the extremity 20 of the band end 15. Each finger 61 is formed with a terminal portion 62 bent outwardly out of the plane of the band end 15, each such terminal portion thus providing a surface 63 angularly related to the plane of the band ends 15 and to the direction of travel of the band. In the illustrated embodiment of this form of the invention, the surfaces 68 lie in a common plane perpendicular to the plane of the band end 15 and to the direction of band travel, and coincident with the plane of the extremity 20 of the belt band.

A similar plate 64 is secured to the inner surface 24 of the band end 15, said plate 64 being formed with a similar series of fingers 66 projecting longitudinally beyond the extremity 20 of the belt band. Each of said fingers 66 is formed with a terminal portion 67 bent inwardly out of the plane of the band end 15, each such terminal portion thus providing a surface 68 angularly related to the plane of the band end 15 and to the direction of travel of the band. In the illustrated embodiment of this form of my invention, the surfaces 68 lie in the common plane of the surfaces 63, substantially perpendicular to the plane of the band end 15 and the direction of band travel, and substantially coincident with the plane of the extremity 20 of the band end 15.

The plates 60 and 64 are preferably secured to the band end 15 by rivets 69 in the manner above described in connection with the plates 17 and 23.

A plate 70, similar to the plate 60, is associated with the outer surface of the band end 16. Said plate 70 is provided with a series of fingers 71, each of which projects longitudinally somewhat beyond the extremity 32 of the band end 16; and each finger 71 is formed with a terminal portion 72 bent outwardly out of the plane of the band end 16. At its outer end, each terminal portion 72 is formed with a lateral extension 73, each of which provides a face 74 engageable with the face 63 of the terminal portion of a corresponding finger 61. The plate 70 is so assembled with the band end 16 that its fingers 71 are staggered with respect to the fingers 61 of the plate 60; and the faces 74, in the illustrated embodiment of this form of my invention, lie in a common plane substantially perpendicular to the plane of the band end 16 and to the direction of band travel, and substantially coincident with the plane of the extremity 32 of the band end 16. A plate 75 like the plate 70 is associated with the inner surface of the band end 16, said plate being provided with fingers 76 like the fingers 71 formed with inturned terminal portions 77 having lateral extensions 78 providing faces 79 which, in the illustrated embodiment of this form of my invention, lie in the plane defined by the faces 74. The plates 70 and 75 are secured to the band end by rivets 80 like the rivets 69.

With certain exceptions to be mentioned hereinafter, the fingers of each series are spaced apart a distance equal to the lateral extent of one of the extensions 73. Thus, looking at Fig. 6, the band end 15 may be shifted upwardly to pass the terminal portions 62 through the spaces between the extensions 73, and may then be shifted to the right to engage said terminal portions 62 behind said extensions 73 to provide a pull connection between the belt ends 15 and 16 by engagement of the faces 63 with the faces 74. Of course, at the same time, the faces 68 of the terminal portions 67 of the fingers 66 are similarly interengaged with the faces 79 of the extensions 78 of the terminal portions 77 of the fingers 76.

The exceptions above referred to are the fingers immediately adjacent the points at which the band ends are notched, as at 81, 82, 83 and 84, for the passage of bolts 85. These fingers are somewhat more widely spaced to accommodate such bolts; and it will be seen that each bolt engages a finger on each of the plates 60, 64, 70 and 75 to hold said fingers and plates against relative movement in a direction to effect disengagement of the pull-connection-establishing faces. Said bolts act to clamp in place a block 86, engaging the plates 60 and 70 and formed with a cavity 87 for the accommodation of the finger terminals 62 and 72, and a block 88 engaging the plates 64 and 75 and formed with a cavity 89 for the accommodation of the finger terminals 67 and 77. These blocks and bolts, of course, complete the splice of Figs. 5–7, securing the interengaged coupling elements against any relative movement tending to separate the interengaged faces.

Figure 9:
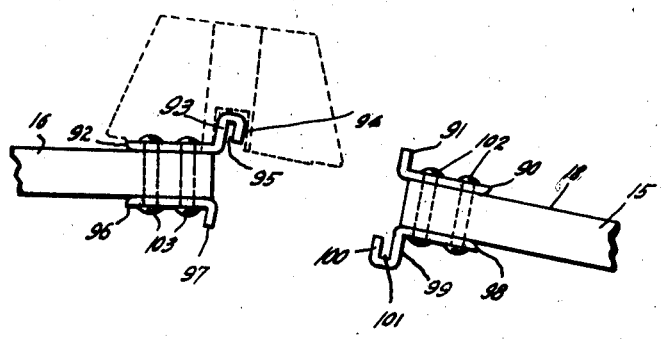
Fig. 9 is a side elevational view of the splice shown in Fig. 8, but before assembly of the band ends.

In Figs. 8 and 9, I have shown a still further form of splice coming within the purview of my present invention. In this form, a plate 90 is associated with the outer surface 18 of the band end 15, said plate being formed at its outer edge with an outturned flange 91. As in the previously-described forms of the invention the plate 90 preferably has a transverse extent substantially equal to that of the band end 15, and the flange 91 is preferably of the same length. A plate 92 is secured to the outer surface of the band end 16, and at its outer edge, said plate 92 is bent outwardly as at 93 and then rebent inwardly as at 94 to form an inwardly-facing channel 95 bodily displaced outwardly from the outer surface of the belt band, and extending transversely thereacross. As is clearly shown in Fig. 8, the flange 91 is adapted to be received in the channel 95 to establish a pull connection between the ends 15 and 16 of the band 10.

Similarly, a plate 96, like the plate 90, is secured to the inner surface of the band end 16, and is provided with an inturned flange 97; while a plate 98 is secured to the inner surface of the band end 15 and is bent inwardly at 99 and then outwardly at 100 to form an outwardly-facing, transversely-extending channel 101 bodily displaced inwardly from the inner surface of the belt band. The flange 97, of course, is received in the channel 101 to assist in the establishment of the pull connection between the band ends.

The plates 90 and 98 are secured to the band end 15 by rivets 102, while the plates 92 and 96 are similarly secured to the band end 16 by rivets 103. A block 104 bears upon the plates 90 and 92, and a block 105 bears upon the plates 96 and 98; and one or more bolts 106 passing through the assembly clamp the blocks in place.

In the form of the invention illustrated in Figs. 8 and 9, special provision is made for minimizing the deleterious effect of sharp flexure of the band 10 immediately adjacent the splice blocks 104 and 105 as the belt runs around a small-diameter sheave. It will be noted that the illustrated embodiment of the splice of Figs. 8 and 9 holds the band ends 15 and 16 some 10° out of coplanar relation. It will be clear, then, that when the splice is located between pulleys, the band will be flexed outwardly by some 5° at each side of the splice block; and that when the splice is located on a sheave, the degree of flexure of the belt at each side of the splice blocks will be some 5° less than it would be if the clamped ends of the band were held by the splice in coplanar relation.

This effect is produced by the fact that the flange 97 is bent back 100° from the plane of the plate 96, while the portion 93 of the plate 92 is bent out only 80° from the plane of that plate, the portion 94 being parallel with the portion 93. The plates 92 and 96 are so proportioned and arranged that the median plane of the flange 97 bisects the channel 95.

Similarly, the median plane of the flange 91 bisects the channel 10, but that plane is perpendicular to the plane of the band end 15. Thus, when the flange 91 is entered in the channel 95 and the flange 97 is entered in the channel 101, the two band ends will automatically be thrown out of coplanar relation to a degree determined by the degree of deviation of the median plane of the flange 97 from perpendicularity to the plane of the band end 16. Preferably, and to obtain full advantage of this arrangement, the inner edges of all four plates 90, 92, 96, and 98 should be curled away from the general planes of the band ends in the manner illustrated in Fig. 8.

I claim as my invention:

1. The combination with a belt band, of a splice flexible about an axis extending transversely of said band for securing together the ends of said band comprising a first series of fingers secured to one end of said band and projecting longitudinally therebeyond, a second series of fingers secured to the other end of said band and projecting longitudinally therebeyond, the fingers of said first series being provided with terminal portions projecting transversely in one direction to provide a series of transversely spaced surfaces lying in a common plane extending transversely of said band and facing the associated band end, the fingers of said second series being staggered with respect to the fingers of said first series and being provided with terminal portions projecting transversely in the opposite direction to provide a series of transversely spaced surfaces lying in a common plane extending transversely of said band and facing the associated band end, said transversely spaced surfaces of the fingers of said first series being engaged with the transversely spaced surfaces of the fingers of said second series in a single plane extending transversely of said band to establish a pull-transmitting connection between said band ends, and means engaging said fingers at points spaced oppositely from the extremities of said band to hold the same against disengagement of said fingers but permitting relative rocking of the fingers of said two series about an axis located in said plane.

2. The combination with a belt band, of a splice flexible about an axis extending transversely of said band for securing together the ends of said band comprising a first series of fingers secured to one end of said band and projecting longitudinally therebeyond, a second series of fingers secured to the other end of said band and projecting longitudinally therebeyond, the fingers of said first series being provided with terminal portions projecting transversely in one direction to provide a series of transversely spaced surfaces lying in a common plane extending transversely of said band and facing the associated band end, the fingers of said second series being staggered with respect to the fingers of said first series and being provided with terminal portions projecting transversely in the opposite direction to provide a series of transversely spaced surfaces lying in a common plane extending transversely of said band and facing the associated band end, said transversely spaced surfaces of the fingers of said first series being engaged with the transversely spaced surfaces of the fingers of said second series in a single plane extending transversely of said band to establish a pull-transmitting connection between said band ends, a block straddling said plane and engaging said fingers at points spaced materially on opposite sides of said plane at the outer surface of said belt, a second block straddling said plane at the inner surface of said belt and normally engaging said belt only at points less widely spaced on opposite sides of said plane, and means clamping said blocks in position.

3. The combination with a belt band of means for connecting together the ends of said band comprising a plate secured to the outer surface of one end of said band, a second plate secured to the outer surface of the other end of said band, a third plate secured to the inner surface of the first-named end of said band, a fourth plate secured to the inner surface of said other end of said band, each of said plates being formed to provide a surface angularly related to the plane of said band and to the direction of travel of said band, said surfaces of said first and second plates being mutually engaged and said surfaces of said third and fourth plates being mutually engaged to provide a pulling connection between said band ends, and means normally holding said interengaged surfaces against separation.

4. The combination with a belt band of means for connecting together the ends of said band comprising a plate secured to the outer surface of one end of said band, a second plate secured to the outer surface of the other end of said band, a third plate secured to the inner surface of the first-named end of said band, a fourth plate secured to the inner surface of said other end of said band, each of said plates being formed to provide a surface angularly related to the plane of said band and to the direction of travel of said band, said surfaces of said first and second plates being mutually engaged and said surfaces of said third and fourth plates being mutually engaged to provide a pulling connection between said band ends, a transversely rigid block engaging said first and second plates and formed with a cavity for the accommodation of the portions of said plates providing said angularly related surfaces, a second transversely rigid block engaging said third and fourth plates and formed with a cavity for the accommodation of the portions of said plates providing said angularly related surfaces, and means engaging said blocks and holding the same against relative movement to prevent separation of said interengaged plate surfaces.

5. The combination with a belt band of means for connecting together the ends of said band comprising a plate secured to the outer surface of one end of said band, a second plate secured to the outer surface of the other end of said band, a third plate secured to the inner surface of the first-named end of said band, a fourth plate secured to the inner surface of said other end of said band, each of said plates being provided with a portion bent out of the plane of the band surface with which said plate is associated, said surfaces of said first and second plates being mutually engaged and said surfaces of said third and fourth plates being mutually engaged to provide a pulling connection between said band ends, and means normally holding said interengaged surfaces against separation.

6. The combination with a belt band of means for connecting together the ends of said band comprising a plate secured to the outer surface of one end of said band and having a portion bent outwardly to provide a face angularly related to the plane of said band, a second plate secured to the outer surface of the other end of said band and having a portion bent out of the plane of said band to provide a face lying substantially parallel to said first-named face when said two band ends are disposed in coplanar relation, said two faces being interengageable to hold said band ends against separation, a third plate secured to the inner surface of an end of said band and having a portion bent outwardly to provide a face angularly related to the plane of said band, a fourth plate secured to the inner surface of the other end of said band and having a portion bent out of the plane of said band to provide a face lying substantially parallel to said last-named face when said two band ends are disposed in coplanar relation, said two last-mentioned faces being likewise interengageable to hold said band ends against separation, and means engaging all of said plates to hold said interengaged faces against separation.

7. The combination with a belt band of means for securing together the ends of said band comprising a plate secured to the outer surface of one end of said band and formed at its outer edge with an out turned flange extending transversely of said band end, a second plate secured to the outer surface of the other end of said band and formed at its outer edge with an inwardly-facing channel bodily spaced outwardly from said band and extending transversely of said other band end, a third plate secured to the inner surface of said first-named band end and formed at its outer edge with an outwardly-facing channel bodily spaced inwardly from said band and extending transversely of said band end, a fourth plate secured to the inner surface of said other band end and formed at its outer edge with an inturned flange extending transversely of said band end, said flange on said first plate being received in said channel on said second plate and said flange on said fourth plate being received in said channel on said third plate to provide a pulling connection between said band ends, and means engaging said plates and holding said flanges against removal from said channels.

8. The combination with a belt band of means for securing together the ends of said band comprising a plate secured to a surface of one end of said band and formed at its outer edge with a flange angularly related to the plane of said band end and extending transversely thereof, a plate secured to the same surface of the other end of said band and formed at its outer edge with a channel bodily displaced from the plane of said belt band, presenting its mouth toward said plane, and extending transversely of said band, said plates being interengaged by entry of said flange into said channel, one of said interengaged elements being substantially perpendicular to the plane of said band and the other being inclined to said plane at an angle other than 90°.

WILLIAM R. PERRY.